W. MARCOWITZ.
BICYCLE LAMP BRACKET.
APPLICATION FILED MAR. 15, 1917.
1,240,233. Patented Sept. 18, 1917.
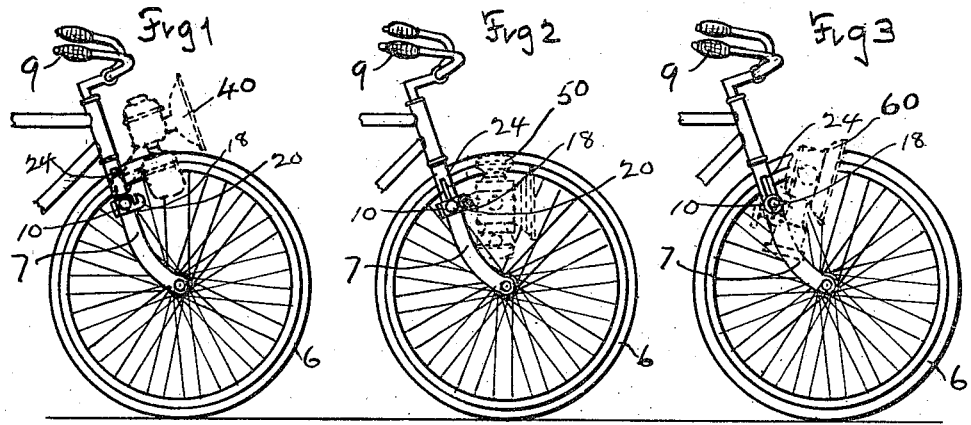
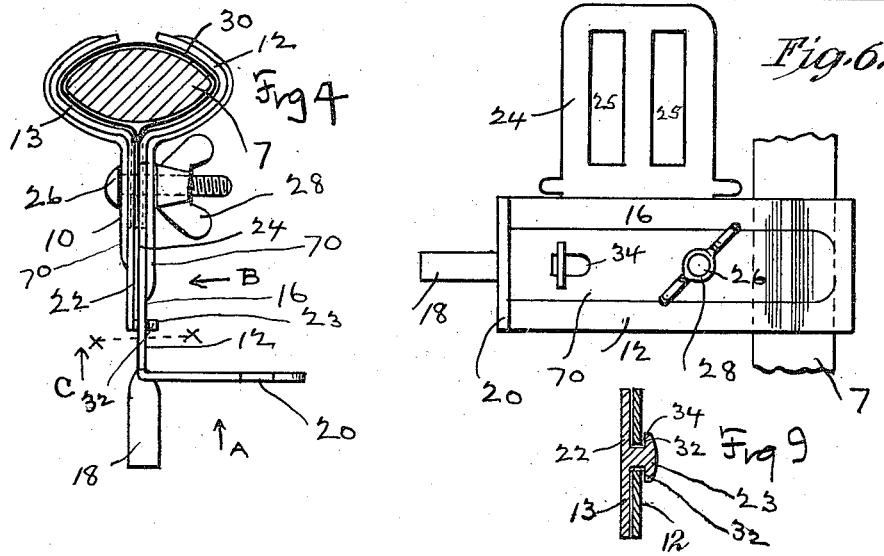
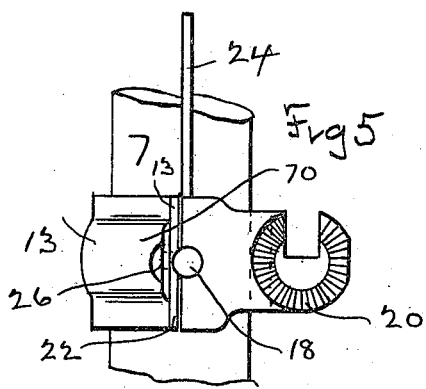
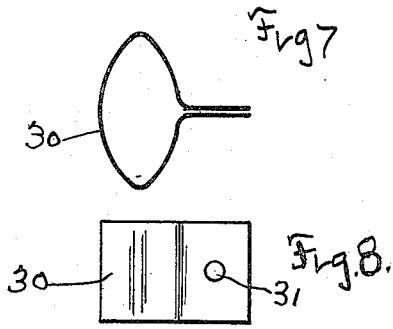
Witnesses:
J. Barritt.
Abraham Bernstein
Inventor
William Marcowitz.

UNITED STATES PATENT OFFICE.

WILLIAM MARCOWITZ, OF NEW YORK, N. Y.

BICYCLE-LAMP BRACKET.

1,240,233.  Specification of Letters Patent. Patented Sept. 18, 1917.

Application filed March 15, 1917. Serial No. 155,118.

*To all whom it may concern:*

Be it known that I, WILLIAM MARCOWITZ, a citizen of the United States, and resident of New York, in the county of New York and State of New York, have invented a certain new and useful Bicycle-Lamp Bracket, of which the following is a specification.

My invention relates to lamp-brackets, and it more especially relates to bicycle lamp brackets.

The main object of my invention is to provide a bicycle lamp-bracket with an unique construction, whereby it will serve as a holder for three different styles of bicycle-lamps, without necessitating the removal of a bracket from off the fork-arm of the bicycle, as is now the case with the present brackets whenever a new style of lamp is to be placed on the bicycle.

Another object is in providing the clamping portions of the bracket with an auxiliary compression or bushing spring, in order to more firmly secure the bracket onto the fork of the bicycle, so that, when the different styles of lamp are placed and removed from off the bracket the same will not accidentally become loosened, and thereby made unserviceable.

Referring to the drawings:—

Figure 1 is a fragmentary view of the front wheel of a bicycle and fork, showing my multiple-bracket attached thereon and holding one style of bicycle-lamp.

Fig. 2 is a view similar to Fig. 1 showing my multiple bracket holding another style of bicycle-lamp.

Fig. 3, is a view similar to Figs. 1 and 2 showing my multiple-bracket holding another style of bicycle-lamp.

Fig. 4 is a cross sectional view of the fork of the bicycle, showing my multiple-bracket with the compress spring attached thereto.

Fig. 5 is a detached elevation of the multiple-bracket looking in direction of arrow A, Fig. 4.

Fig. 6 is a side view of my multiple bracket looking in direction of arrow B Fig. 4.

Fig. 7 plan view of bushing compression spring.

Fig. 8 side view of Fig. 7.

Fig. 9 a cross section on line $x$ $x$ Fig. 4 looking in direction of arrow C.

Numeral 6 represents the front wheel of a bicycle.

Numeral 7 the fork arm with handle 9.

On to the fork 7 at any convenient place thereon, is placed my multiple bracket 10, consisting of two clamping members 12—13, adapted to fit around the oval shaped fork 7, see Fig. 4. Clamping member 12 is integrally provided with a flat outwardly extending member 16, terminating in the integral circular extending portion 18, and also in a right angle flat member 20 with hook, both to be described more fully later on.

The clamping member 13 is also integrally provided with a flat outwardly extending member 22, terminating in a right angle hook 23, to be described hereafter.

The extending member 16 of clamping arm 12 has also extending from it, upwardly (see Fig. 5) the member 24, which is provided with openings 25 to lighten same.

The clamping members and their adjacent arms are securely held together by the bolt 26 passing through holes in the members 16 and 22 and said bolt being provided with a set nut 28. When the clamping arms encircle the fork 7 see Fig. 4 it is necessary in order to have them hold more firmly on fork to interpose a compression member between the arms. In order to provide the multiple bracket with said means for holding same firmly on the bicycle fork, I use the auxiliary compression bushing spring 30, which is interposed between the clamping arms 12—13 and the fork 7, (see Fig. 4). To use the spring 30 first encircle it over the fork. Then place the clamping arms over the said spring (see Fig. 4), and then pass the bolt 26 through holes in extension 16, 22 and at the same time through holes 31 in the spring 30. Before the clamping arm 13 is placed over spring 30 the right angle hook 23 is first inserted into slot 34 in member 16 after which said arm is turned into parallelism with the other clamping arm, which will cause the ears 32 of the hook 23 to hold themselves on the opposite side of member 16 thus preventing member 22 from loosening.

When all the parts are in position and the bolt 26 in place, the thumb screw 28 is then screwed up so as to firmly hold the parts on the fork, as the spring 30, will take up any play which would be likely to cause looseness.

The bracket described is then secured on to the fork of the bicycle and remains fixedly thereon so that different styles of lamps can be placed on same, and removed at will. In order to do this portion 24 of bracket is adapted to hold lamp 40. Portion 20 of the bracket adapted to hold lamp 50 Fig. 2 and portion 18 of bracket is adapted to hold lamp 60 Fig. 3.

The means for holding the lamps on their holders being part of the lamp, is no part of this invention. The bracket will hold any style of bicycle lamp in the market. The holding members of the bracket are shown integral with their arms, but I am aware that they can be of separate pieces secured to their parts, and not destroy the bracket's usefulness, which primarily, consists of a three-in-one or multiple holding bicycle bracket. The members 16—22 are depressed or ribbed at 70 for strength and as a seat for spring 30 see Fig. 4.

What I claim is:—

1. A bicycle lamp bracket adapted for alternately supporting lamps of different types, having opposed clamping jaws at one end, a cylindrical lamp supporting pin at the other end, a forwardly extending hook-shaped lamp supporting plate, and an upwardly extending lamp supporting plate.

2. A bicycle lamp bracket for supporting lamps from the fork arm, comprising opposed clamping jaws at one end and means for attachment to a lamp at the other, a clamping bolt for closing the jaws and an auxiliary holding spring surrounding the fork arm within the jaws and having outwardly extending perforated ears through which the clamping bolt passes.

Signed at New York, in the county of New York and State of New York, this 14th day of March, A. D. 1917.

WILLIAM MARCOWITZ.

Witnesses:
O. BARRITT,
ABRAHAM BERNSTEIN.

Copies of this patent may be obtained for five cents each, by addressing the "Commissioner of Patents, Washington, D. C."